United States Patent [19]

Yamamoto et al.

[11] Patent Number: 4,750,385

[45] Date of Patent: Jun. 14, 1988

[54] BRAKE RESPONSIVE AUTOMATIC TRANSMISSION CONTROL APPARATUS

[75] Inventors: Mitsuo Yamamoto, Okazaki; Takaki Manabe, Chiryu; Nobuyoshi Nagura, Anjo, all of Japan

[73] Assignee: Aisin Seiki Kabushiki Kaisha, Aichi, Japan

[21] Appl. No.: 844,492

[22] Filed: Mar. 26, 1986

[30] Foreign Application Priority Data

Mar. 26, 1985 [JP] Japan .................. 60-061623

[51] Int. Cl.⁴ ............................................ B60K 41/06
[52] U.S. Cl. ........................................ 74/866; 74/861
[58] Field of Search .................. 74/866, 864, 863, 861; 364/424.1; 180/170, 171

[56] References Cited

U.S. PATENT DOCUMENTS

| | | | |
|---|---|---|---|
| 3,759,344 | 9/1973 | Blee et al. | 74/864 X |
| 4,393,732 | 7/1983 | Suzuki et al. | 74/866 |
| 4,476,530 | 10/1984 | Pannier et al. | 74/866 X |
| 4,499,542 | 2/1985 | Hamajima et al. | 74/866 X |
| 4,506,752 | 3/1985 | Hara et al. | 74/866 X |
| 4,531,432 | 7/1985 | Inagaki et al. | 74/866 |
| 4,557,162 | 12/1985 | Fukunaga | 74/866 |
| 4,560,024 | 12/1985 | Noda et al. | 74/866 X |
| 4,572,030 | 2/1986 | Sakurai et al. | 74/866 |

FOREIGN PATENT DOCUMENTS 252500 11/1984 Japan .

*Primary Examiner*—Leslie Braun
*Assistant Examiner*—David Novais
*Attorney, Agent, or Firm*—Sughrue, Mion, Zinn, Macpeak & Seas

[57] ABSTRACT

An automatic transmission control apparatus detects an abrupt loss of vehicle speed from the speed sensor due to failure of the speed sensor. The control apparatus detects a condition of the brake operation so that the abrupt loss of the vehicle speed is detected for transmission control purposes when the brake is under non-operating conditions.

3 Claims, 3 Drawing Sheets

BRAKE RESPONSIVE AUTOMATIC TRANSMISSION CONTROL APPARATUS

BACKGROUND OF THE INVENTION

The present invention is directed to an apparatus and method for controlling an automatic transmisson for an automobile. More specifically the present invention relates to an apparatus and method for controlling an automatic transmission in the event of an interruption or loss of the vehicle velocity signal.

Conventional automatic transmission control apparatus have a control circuit which gives a shift signal to shift the transmission in response to the vehicle velocity and the output torque of an engine or throttle opening signal. The vehicle velocity signal is supplied from a speed sensor with a reed switch which detects the revolution speed of an output shaft. The speed sensor is comprised of a magnet rotated by the output shaft for a speedometer cable which transmits rotary motion from the output shaft to a speedometer. The reed switch opens and closes under the influence of the rotating magnet to output pulses at a frequency related to the velocity of the vehicle. The speed sensor is positioned adjacent to the output shaft or in the speedometer and has its wires connected to the control circuit. With such a speed sensor, the reed switch or the wires may be broken to cause an interruption or loss of the vehicle speed signal. Ordinarily this produces the same effect as a vehicle at rest and the control circuit gives a signal to shift the transmission downwardly to a low gear. This may not be a problem at low vehicle speed but it causes violent braking which jolts the driver and passengers and may lead to engine or transmission failure at higher vehicle speeds.

U.S. Pat. No. 4,499,542 discloses a safety circuit which responds to the interruption or loss of the vehicle velocity signal to control the transmission to maintain a high speed gear ratio. After the vehicle velocity signal is restored, the safety control circuit allows the transmission to change gears. However this safety control circuit maintains the same high speed gear ratio unless the vehicle velocity signal is restored. Therefore usual driving of the vehicle will be impossible once the speed sensor breaks down.

Japanese Patent Application No. 59-252,500, filed Nov. 29, 1984, which corresponds to pending U.S. patent application Ser. No. 802,399, and is assigned to the same assignee as the present application, discloses a control apparatus which detects an apparent interruption or an abrupt loss of vehicle speed due to failure of the speed sensor and shifts the automatic transmission to a higher rear ratio. The control apparatus detects the engine rotation and the position of the shift lever so that when the engine rotation is under a predetermined level the control apparatus allows the automatic transmission to be shifted by the position of the shift lever. Thus the pending application allows the shifting of the automatic transmission even in the absence of a vehicle speed signal to provide responsible driving conditions at all times. According to the arrangement of this pending application, an apparent abrupt loss of the vehicle speed as indicated by the speed sensor is detected by the steps as follows: a counter circuit of the micro-computer counts pulses from the speed sensor within a time interval; the micro-computer calculates the vehicle speed; if the current vehicle speed is "0" the computer refers the previous vehicle speed; and if the previous vehicle speed is higher than a predetermined value the computer decides the speed change is an abrupt one. These steps also detect an apparent abrupt loss of the vehicle speed as indicated by the speed sensor in the event of wheel locking which may be caused by a brake operation. However, under the wheel locking condition the speed sensor may not have failed.

SUMMARY OF THE INVENTION

The present invention provides a new and improved apparatus for controlling an automatic transmission for an automobile which precludes the situations described above.

The present invention provides a new and improved apparatus for controlling an automatic transmission for an automobile in response to an interruption or loss of the vehicle speed signal.

The present invention provides a new and improved apparatus for controlling an automatic transmission for an automobile in response to an interruption or loss of the vehicle speed signal.

The present invention provides a speed sensor for detecting the vehicle speed, a throttle opening sensor for detecting the opening of the throttle and a shift position sensor for detecting the position of the shift lever. The automatic transmission is controlled by the vehicle speed and the opening of the throttle in response to the shift pattern which is selected by the position of the shift lever. The present invention further provides a brake sensor means for detecting a condition of the brake operation and detecting circuit means for detecting an abrupt loss of the vehicle speed when the brake is under non-operating conditions. The present invention also provides control circuit means for shifting the automatic transmission in response to the detecting circuit means for detecting an abrupt loss of the vehicle speed.

As a result of the foregoing arrangement, the detecting circuit means for detecting an abrupt loss of the vehicle speed will detect the abrupt loss of the vehicle speed when the brake is under nonoperating condition. Thus the present invention prevents the detection of an abrupt loss of the vehicle speed signal from the speed sensor due to a wheel locking condition.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
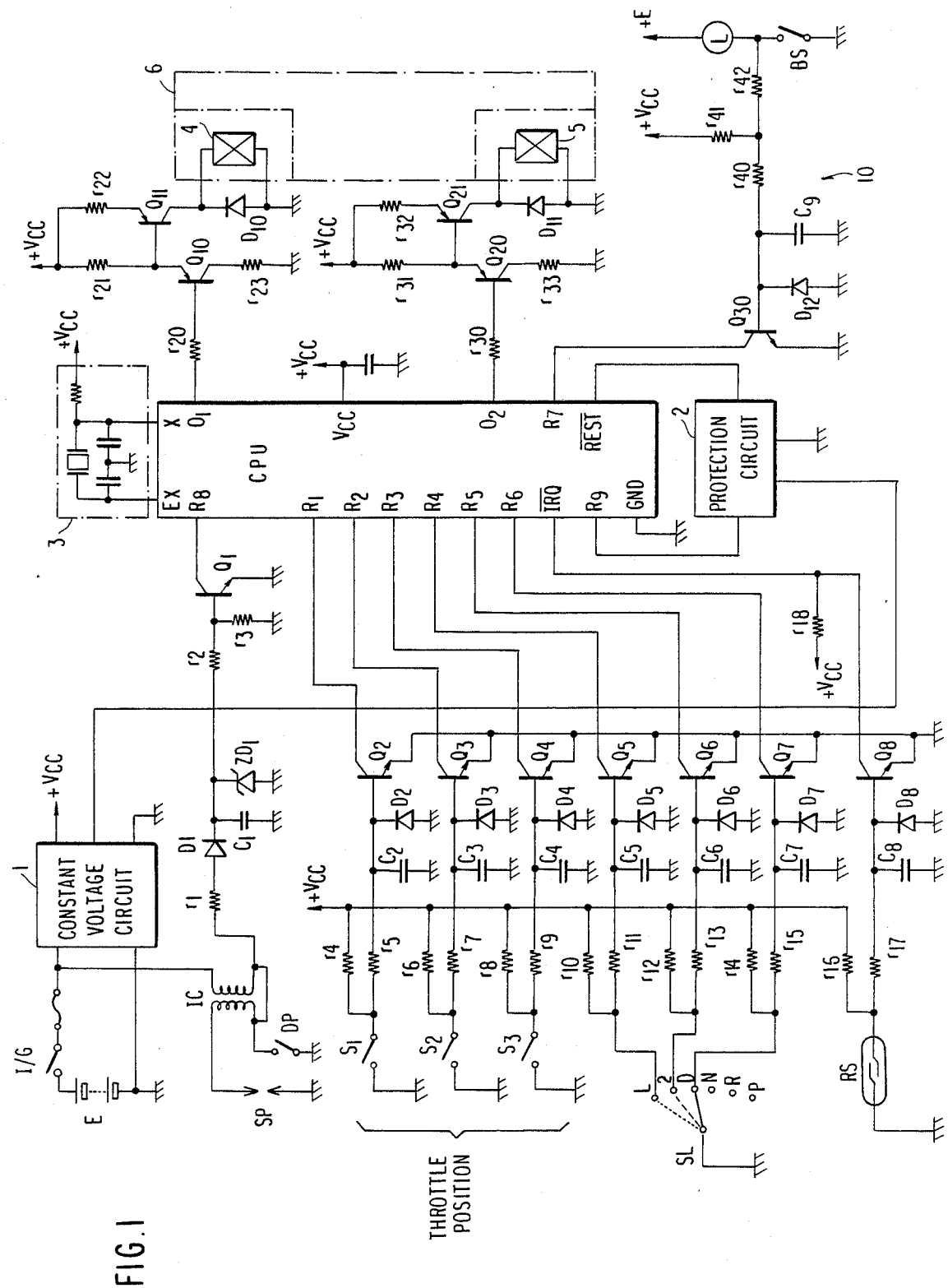
FIG. 1 is a circuit diagram of an automatic transmission control system according to the present invention.

FIG. 1 illustrates the control circuit of an automatic transmission embodied in the present invention. A constant voltage circuit 1 supplies a constant voltage + Vcc from a battery E to the control circuit. The constant voltage circuit 1 is also connected to a protection circuit 2 for preventing the micro-computer CPU from an erroneous run caused by the supply of improper voltage. The protection circuit 2 usually stops the micro-computer CPU from an erroneous run when the protection circuit determines that a predetermined program is not completed within the prescribed time in the micro-computer CPU. The constant voltage circuit 1 and the protection circuit 2 are conventionally used in computers. The micro-computer CPU may be a microprocessor or a one-chip micro-computer. As an example the present embodiment uses an MB8850 micro-computer. The micro-computer CPU operates with a signal from a pulse generating circuit 3 as a clock-pulse. Ports R1, R2, and R3, are connected to a throttle opening sensor. Ports R4, R5, and R6 are connected to a shift positioning sensor. Port R8 is connected to an engine rotation sensor and port IRQ is connected to a vehicle velocity sensor.

The engine rotation sensor detects the ignition signals of spark plug SP which are supplied from the ignition coil IC by opening and closing of breaker DP through the resistor R1 and diode D1. Capacitor C1 is used for reducing noises and the zenor diode ZD1 is for reducing voltage surges. The transistor Q1 is biased by resistors R2 and R3 and is switched to the ON/OFF state in response to the ignition signals.

The throttle opening sensor comprises switches S1, S2, and S3 which respond to the opening of the throttle valve. The switch S1 causes transistor Q2 to switch by changing the voltage at a connection of resistors R4 and R5. The switches S2 and S3 switch transistors Q3 and Q4, respectively. In this embodiment three switches output three bit signals to the micro-computer CPU as the throttle opening signals.

The shift positioning sensor detects the position of shift lever SL. The shift lever SL is used for choosing shift modes or running states which are memorized in the micro-computer CPU and the automatic transmission is controlled by a micro-computer CPU in accordance with the memorized modes. When the L range is selected by the shift lever SL, terminal L is grounded and transistor Q5 turns to the OFF state. Transistors Q6 and Q7 return to the OFF state when the second range and the drive range are selected by the shift lever SL, respectively.

The vehicle velocity sensor comprises a reed switch RS which opens and closes to provide output pulses under the influence of a magnet (not shown) which is rotated by a speedometer cable which transmits rotary motion from an output shaft to a speedometer. The reed switch RS turns transistor Q8 ON and OFF by changing voltages at the connection of the resistors R16 and R17. Capacitors C2–C8 are for reducing noises, the diodes D2–D8 are for absorbing voltage surges and the resistor R18 is for pull-up.

The brake sensor 10 detects the condition of a brake switch BS which is mechanically connected to a brake pedal (not shown) to turn a stop lamp L on when the brake pedal is operated by a driver. Transistor Q30 is switched to the ON/OFF state in response to the voltage at a connection of resistors r41 and r42 through a resistor r40. The resistor r41 is connected to the constant voltage +Vcc and the resistor r42 is connected to the brake switch BS. Capacitor C9 is used for reducing noises and a diode D12 is for reducing voltage surges. When the brake pedal is operated the brake switch BS is closed to turn the stop lamp L on. Therefore, the voltage at the connection of resistors r41 and r42 drops to turn the transistor Q30 to the OFF state.

The output ports O1 and O2 of the micro-computer CPU are connected to driving circuits for solenoid valves 4 and 5. When the output O1 outputs an "H" level signal (high voltage signal) to a base terminal of the transistor Q10 through the resistor R20, the transistor Q10 turns OFF and the voltage at the base of the transistor Q11 is raised by the resistor R21 whereby the transistor Q11 turns OFF. Therefore the coil 4 of the solenoid valve is deenergized. When the output O1 outputs an "L" level signal (low voltage signal) to the base terminal of the transistor Q10 through the resistor R20, the transistor Q10 turns ON and the voltage at the base of the transistor Q11 is reduced by resistor R23 whereby the transistor Q11 turns ON to energize the coil 4. In the same manner the driving circuit which is comprised of resistors R30 and R31, R32 and R33 and transistors Q20 and Q21 deenergizes or energizes the coil 5 of the second solenoid valve in response to "H" or "L" level output signals from the output port O2. Diodes D10 and D11 are for absorbing electromotive force generated in the coils 4 and 5, respectively.

As described above the automatic transmission 6 includes a first shift solenoid valve having a coil 4 and a second shift solenoid valve having a coil 5. The automatic transmission 6 is designed with three gear ratios. When the first shift solenoid valve is energized, the automatic transmission 6 is in first gear (low speed gear ratio). When the second shift solenoid valve is energized, the automatic transmission is in second gear. When the first and second shift solenoid valves are both energized, the automatic transmission 6 is in third gear (high speed gear ratio). The shift manner may be designated in any suitable manner since the shift pattern is adaptable to many changes.

Figure 2:
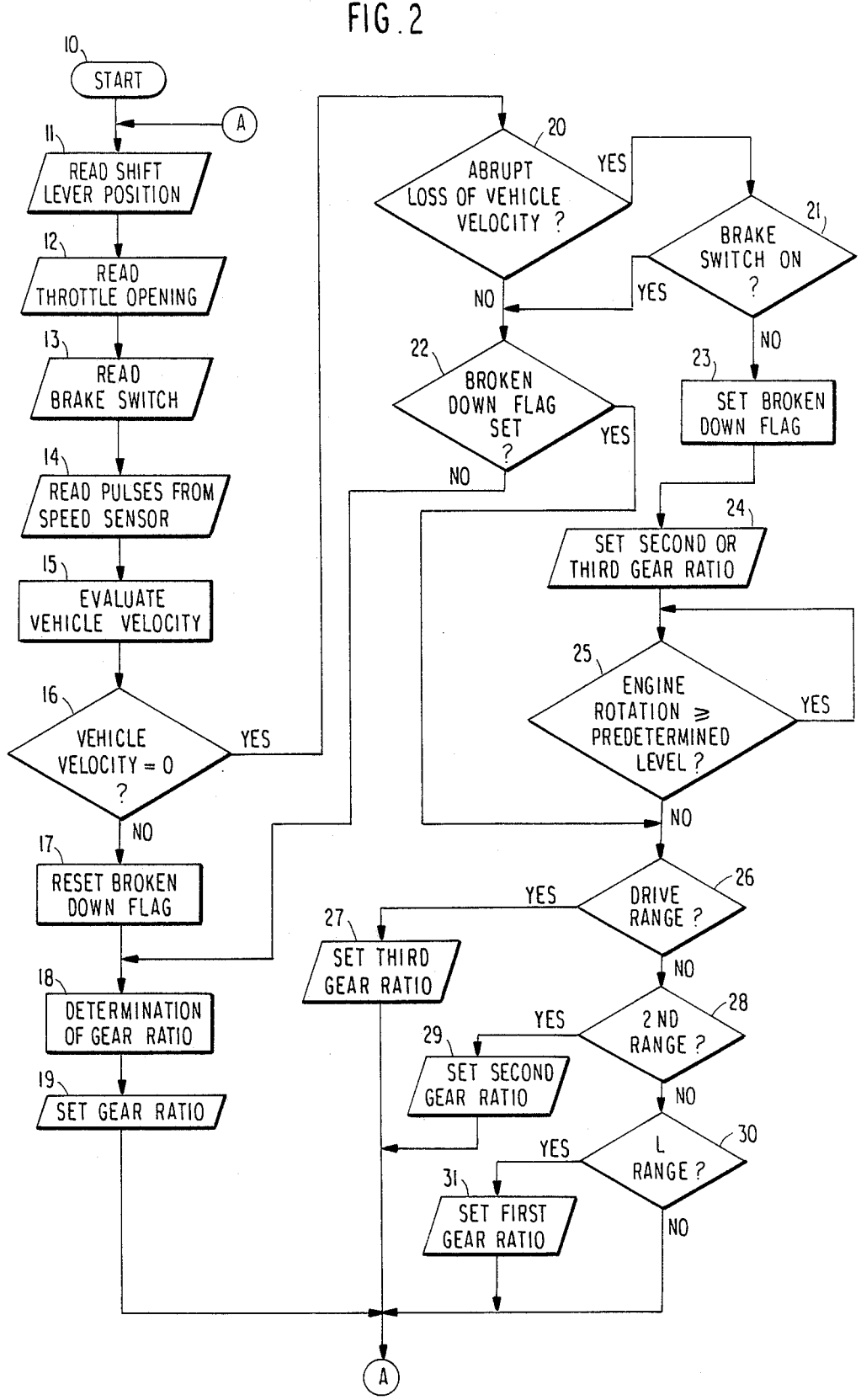
FIG. 2 is a flow diagram for the circuit shown in FIG. 1 according to the present invention.

The microcomputer CPU of the embodiment of the present invention receives the signals from an engine rotation sensor, the throttle opening sensor, the shift positioning sensor, the brake sensor, and the vehicle velocity sensor and operates in the following manner. FIG. 2 shows a flow diagram of the circuit shown in FIG. 1. In step 10 the control of the automatic transmission starts to clear memories in the microcomputer CPU and to initialize the ports of the micro-computer CPU. In step 11 the shift position is read to determine the shift pattern. In step 12 the throttle opening is read as the state of the switches at S1, S2, and S3. In step 13 the condition of the brake operation is read as the state of the brake switch BS. In step 14 a counter circuit of the microcomputer CPU counts pulses for the reed switch RS within a time interval. Then in step 15 computer CPU calculates the vehicle velocity. The control goes to step 16 where the decision is made as to whether or not the current vehicle velocity is "0". If the current vehicle velocity is not "0" then the control goes to step 17 to reset the "broken down" flag. This means that the vehicle velocity sensor is not broken down or the signals from the vehicle velocity sensor have recovered from an interruption or loss of the signals. The control then goes to step 18 to decide the gear responding to the vehicle velocity and the throttle opening in accordance with the shift pattern selected by the shift position. In step 19 the control outputs the signals to the driving circuit of the solenoid valves 4 and 5 to shift the gears. These steps 18 and 19 are conventional in automatic transmission control.

According to step 16, if the current vehicle velocity is "0" then the control goes to step 20 where the decision is made whether or not the velocity change is an abrupt one. In step 20 the current vehicle velocity is compared with the previous vehicle velocity and the decision that the velocity change is abrupt is made if the difference between the two velocities is higher than a predetermined value. If the velocity change is not abrupt then the control goes to step 22 to decide whether or not the "broken down" flag is set. If the flag is already set, it means that the loss of the vehicle velocity is continued by the failure of the vehicle velocity sensor. If the flag is not set, it means that the vehicle is at rest in a normal manner. Therefore when the flag is not set the control goes to step 18.

If the decision is made in step 20 that the speed change is abrupt the control goes to step 21 where the decision is made whether or not the brake is under operating condition. If the brake switch BS is in the OFF state the control goes to step 23 to set the "broken down" flag. It means that the abrupt loss of the vehicle speed is caused when the brake is under non-operating condition. Therefore, the abrupt loss of the vehicle speed is due to the failure of the speed sensor.

After setting the flag, the control in step 24 shifts the automatic transmission 6 to the second gear or the third gear to hold the automatic transmission. Which gear is selected in step 24 depends upon the specific type of automatic transmission involved. In step 25 the engine rotation signal is read and the decision is made whether or not the engine rotation is under a predetermined level. This predetermined level is decided from the engine rotation range corresponding to the vehicle velocity which decides to shift the gears down to the first gear ratio. If the engine rotation is over the predetermined level, the control keeps the particular gear. When the engine rotation is under the predetermined level, the control goes to steps 26–31 where the control allows the automatic transmission to shift in accordance with the position of the shift lever SL. In steps 26, 28, and 30, the position of the shift lever SL is detected and when the position of the shift lever SL is in the D range the control goes to step 27 to shift the automatic transmission to third gear. When the position of the shift lever SL is in the second range the control goes to step 29 to shift the automatic transmission to the second gear and when the position of the shift lever SL is in the third range the control goes to step 31 to shift the automatic transmission to the first gear.

Returning to step 21, if the brake switch is in the ON state the control goes to step 22. In step 22 if the "broken down" flag is set the control goes to step 26 to continue the control under the failure of the vehicle speed sensor. It means that the brake is operated after the abrupt loss of the vehicle speed due to the failure of the speed sensor is detected. If the "broken down" flag is not set in step 22 the control goes to step 18. It means that the abrupt loss of the vehicle speed is caused when the brake is under operating condition. Therefore, there is a possibility of wheel locking due to the brake operation.

Therefore in the event of interruption or loss of vehicle speed at higher vehicle speeds when the brake is under non-operating condition, the "broken down" flag is set by the steps 16, 20, 21, and 23, and the automatic transmission is kept at the higher gear ratio by step 24. After the engine rotation is under a predetermined level, first, second, and third gears can be selected by the position of the shift lever SL. Unless the vehicle velocity signal recovers, the "broken down" flag is set to allow the automatic transmission to be shifted by the position of the shift lever SL by step 22.

In the event of the interruption or loss of vehicle speed at higher vehicle speeds when the brake is under operating condition, the "broken down" flag is not set so that the control returns to the usual steps 18 and 29.

Figure 3:
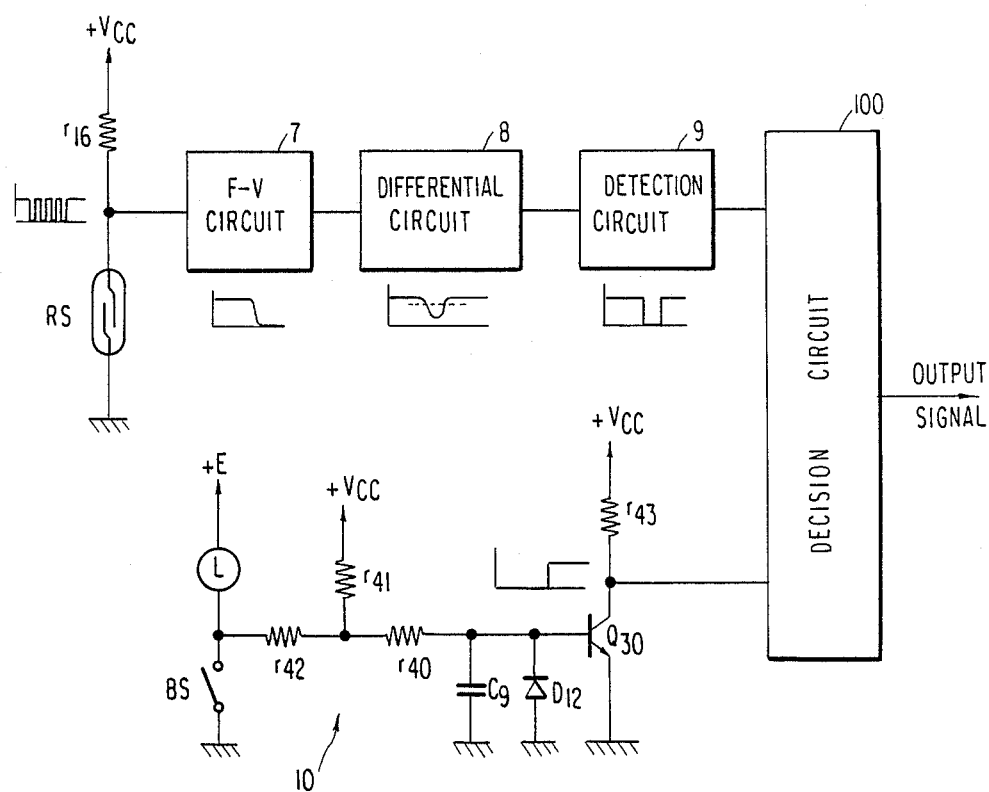
FIG. 3 is a detection circuit for an automatic transmission control system according to the present invention.

FIG. 3 illustrates another embodiment of a detection circuit which detects an abrupt loss of the vehicle speed signal from the speed sensor when the brake is under non-operating condition.

The vehicle speed sensor comprises a reed switch RS as same as the reed switch RS shown in FIG. 1. The reed switch RS outputs pulses to F-V circuit 7. F-V circuit 7 outputs voltage in response to the frequency of the pulses. Differential circuit 8 detects a down change of the voltage signal from the F-V circuit 7. Detection circuit 9 comprises a comparator which compares the change of the voltage signal with a predetermined value. If the change is greater than the predetermined value the detection circuit 9 outputs a signal which indicates the loss of the vehicle speed is abrupt. Brake sensor 10 is the same as the brake sensor 10 as shown in FIG. 1. However in this embodiment the brake sensor 10 includes a resistor r43 for pull-up. Decision circuit 100 comprises logic gates such as AND gates. The decision circuit 100 outputs a signal which indicates the speed sensor failure if the loss of the vehicle speed is abrupt when the brake is under non-operating condition.

While the invention has been particularly shown and described with reference to a preferred embodiment thereof it will be understood by those in the art that various changes in form and details may be made therein without departing from the spirit and scope of the invention.

What is claimed is:

1. An automatic transmission control apparatus comprising:
   speed sensor means for detecting a wheel speed;
   throttle opening sensor means for detecting the throttle opening of an engine;
   shift position sensor means for detecting the position of a shift lever;
   brake sensor means for detecting a condition of a brake operation; and
   first means for shifting the automatic transmission in accordance with the signals from said speed sensor means, said throttle opening sensor means and said shift position sensor means;
   second means for detecting an abrupt loss of the wheel speed;
   third means for determining whether the abrupt loss of the wheel speed occurs while the brake is in an operating or non-operating condition; and
   fourth means for shifting the automatic transmission in response to said third means determining that the abrupt loss of the wheel speed occurs when said brake is in non-operating condition.

2. An automatic transmission control apparatus according to claim 1 wherein wheel said fourth means for shifting the automatic transmission is inoperable when the brake is under operating conditions.

3. An automatic transmission control apparatus according to claim 1 further comprising rotational sensor means for detecting the rotation of the engine wherein said fourth means for shifting the automatic transmission shifts the automatic transmission to a higher gear ratio in response to said second means for detecting an abrupt loss of the wheel speed and shifts the automatic transmission in response to the position signal from said shift position sensor means when the engine rotation is under a predetermined level.

* * * * *